United States Patent
Zhang et al.

(10) Patent No.: US 12,473,235 B2
(45) Date of Patent: Nov. 18, 2025

(54) PREPARATION METHOD OF HIGH-THERMAL-CONDUCTIVITY AND NET-SIZE SILICON NITRIDE CERAMIC SUBSTRATE

(71) Applicant: SHANGHAI INSTITUTE OF CERAMICS, CHINESE ACADEMY OF SCIENCES, Shanghai (CN)

(72) Inventors: Hui Zhang, Shanghai (CN); Xuejian Liu, Shanghai (CN); Jindi Jiang, Shanghai (CN); Xiumin Yao, Shanghai (CN); Zhengren Huang, Shanghai (CN); Zhongming Chen, Shanghai (CN)

(73) Assignee: SHANGHAI INSTITUTE OF CERAMICS, CHINESE ACADEMY OF SCIENCES, Shanghai (CN)

( * ) Notice: Subject to any disclaimer, the term of this patent is extended or adjusted under 35 U.S.C. 154(b) by 382 days.

(21) Appl. No.: 18/273,332

(22) PCT Filed: Jan. 17, 2022

(86) PCT No.: PCT/CN2022/072352
§ 371 (c)(1),
(2) Date: Jul. 20, 2023

(87) PCT Pub. No.: WO2022/156636
PCT Pub. Date: Jul. 28, 2022

(65) Prior Publication Data
US 2024/0116821 A1    Apr. 11, 2024

(30) Foreign Application Priority Data
Jan. 20, 2021    (CN) .......................... 202110074294.2

(51) Int. Cl.
*C04B 35/591* (2006.01)
*C04B 35/34* (2006.01)
(Continued)

(52) U.S. Cl.
CPC .......... *C04B 35/587* (2013.01); *C04B 35/591* (2013.01); *C04B 35/62218* (2013.01);
(Continued)

(58) Field of Classification Search
CPC ................ C04B 35/587; C04B 35/591; C04B 35/62218; C04B 35/6261; C04B 35/6264;
(Continued)

(56) References Cited

U.S. PATENT DOCUMENTS 6,242,374 B1 *   6/2001   Komatsu ............. C04B 35/5935
                                                          501/97.3

FOREIGN PATENT DOCUMENTS

| CN | 102329134 A | 1/2012 |
| CN | 105884376 A | 8/2016 |

(Continued)

OTHER PUBLICATIONS

[NPL-1] Shi et al. (CN 107857595 A); Mar. 30, 2018 (European Patent Office machine translation to English). (Year: 2018).*
(Continued)

*Primary Examiner* — Donald M Flores, Jr.
(74) *Attorney, Agent, or Firm* — Fleit Intellectual Property Law; Paul D. Bianco

(57) ABSTRACT

A preparation method of a high-thermal-conductivity and net-size silicon nitride ceramic substrate includes the following steps: (1) mixing an original powder, a sintering aid, a dispersant, a defoamer, a binder, and a plasticizer in a protective atmosphere to allow vacuum degassing to obtain a mixed slurry; (2) subjecting the mixed slurry to tape casting and drying in a nitrogen atmosphere to obtain a first
(Continued)

green body; (3) subjecting the first green body to shaping pretreatment to obtain a second green body; (4) subjecting the second green body to debonding at 500° C. to 900° C. to obtain a third green body; and (5) subjecting the third green body to gas pressure sintering in a nitrogen atmosphere at 1,800° C. to 2,000° C. to obtain the high-thermal-conductivity and net-size silicon nitride ceramic substrate.

20 Claims, 7 Drawing Sheets

(51) Int. Cl.
| | | |
|---|---|---|
| *C04B 35/587* | (2006.01) | |
| *C04B 35/622* | (2006.01) | |
| *C04B 35/626* | (2006.01) | |
| *C04B 35/63* | (2006.01) | |
| *C04B 35/634* | (2006.01) | |
| *C04B 35/638* | (2006.01) | |
| *C04B 35/64* | (2006.01) | |
| *C09K 5/14* | (2006.01) | |

(52) U.S. Cl.
CPC ...... *C04B 35/6261* (2013.01); *C04B 35/6264* (2013.01); *C04B 35/62655* (2013.01); *C04B 35/6303* (2013.01); *C04B 35/6342* (2013.01); *C04B 35/638* (2013.01); *C04B 35/64* (2013.01); *C09K 5/14* (2013.01); *C04B 2235/3206* (2013.01); *C04B 2235/3225* (2013.01); *C04B 2235/3873* (2013.01); *C04B 2235/428* (2013.01); *C04B 2235/6025* (2013.01); *C04B 2235/604* (2013.01); *C04B 2235/606* (2013.01); *C04B 2235/6567* (2013.01); *C04B 2235/6581* (2013.01); *C04B 2235/6584* (2013.01); *C04B 2235/661* (2013.01); *Y10T 428/24355* (2015.01)

(58) Field of Classification Search
CPC .......... C04B 35/62655; C04B 35/6303; C04B 35/6342; C04B 35/638; C04B 35/64; C04B 2235/3206; C04B 2235/3225; C04B 2235/3873; C04B 2235/428; C04B 2235/6025; C04B 2235/604; C04B 2235/606; C04B 2235/6567; C04B 2235/6581; C04B 2235/6584; C04B 2235/661; C09K 5/14; Y10T 428/24355
See application file for complete search history.

(56) References Cited

FOREIGN PATENT DOCUMENTS

| | | | | |
|---|---|---|---|---|
| CN | 106631039 | A | 5/2017 | |
| CN | 107857595 | A * | 3/2018 | ............. C04B 5/584 |
| CN | 108863395 | A | 11/2018 | |
| CN | 109400175 | A | 3/2019 | |
| CN | 112830797 | A | 5/2021 | |
| JP | H0283263 | A | 3/1990 | |

OTHER PUBLICATIONS

International Preliminary Report on Patentability for PCT/CN2022/72352, filed Jan. 17, 2022.
International Search Report dated Mar. 15, 2022 with Written Opinion for PCT/CN2022/72352, filed Jan. 17, 2022.
Chen, Study on Isostatic Pressing YSZ Membrane Fabricated by Tape Casting, Journal of Inorganic Materials, vol. 14, No. 5, Oct. 31, 1999.
First Office Action dated Jul. 22, 2021, for Chinese Patent Application No. 202110074294.2.

* cited by examiner

Table 1:

| | Ball milling atmosphere | Ball milling parameters | Vacuum degassing | Drying atmosphere | Temperatures at first/second/third stages (°C) | Shaping pressure | Debonding | Sintering |
|---|---|---|---|---|---|---|---|---|
| Example 1 | 0.1MPa/N$_2$ | 100rpm/ 4h+8h | -0.5kPa | 0.1MPa/ N$_2$ /12h | 45/65/80 | 100MPa | 700°C×2h 0.15MPa | 1900°C×10h 5MPa N$_2$ |
| Example 2 | 0.1MPa/N$_2$ | 30rpm/ 12h+12h | -0.2 kPa | 0.12MPa/ N$_2$ /24h | 40/55/70 | 40MPa | 500°C×3h 0.2MPa | 1800°C×12h 0.5MPa N$_2$ |
| Example 3 | 0.1MPa/N$_2$ | 50rpm/ 10h+8h | -3 kPa | 0.15MPa/ N$_2$ /8h | 45/65/75 | 200MPa | 800°C×2h 0.15MPa | 1980°C×4h 10MPa N$_2$ |
| Example 4 | 0.1MPa/N$_2$ | 80rpm/ 8h+6h | -8 kPa | 0.18MPa/ N$_2$ /6h | 50/70/85 | 150MPa | 600°C×2h 0.12MPa | 1950°C×6h 8MPa N$_2$ |
| Example 5 | 0.1MPa/N$_2$ | 60rpm/ 10h+8h | -1 kPa | 0.2MPa/ N$_2$ /10h | 40/60/80 | 80MPa | 900°C×2h 0.2MPa | 1850°C×8h 2MPa N$_2$ |
| Example 6 | 0.1MPa/N$_2$ | 100rpm/ 4h+8h | -0.5kPa | 0.2MPa/ N$_2$ /12h | 45/65/80 | 150MPa | 700°C×2h 0.15MPa | 1900°C×10h 5MPa N$_2$ |
| Example 7 | 0.1MPa/N$_2$ | 30rpm/ 12h+12h | -0.2 kPa | 0.1MPa/ N$_2$ /24h | 55/75 | 100MPa | 700°C×2h 0.15MPa | 1900°C×10h 5MPa N$_2$ |
| Example 8 | 0.1MPa/N$_2$ | 50rpm/ 10h+8h | -3 kPa | 0.1MPa/ N$_2$ /8h | 50/70 | 40MPa | 700°C×2h 0.15MPa | 1900°C×10h 5MPa N$_2$ |
| Example 9 | 0.1MPa/N$_2$ | 80rpm/ 6h+8h | -1kPa | 0.1MPa/ N$_2$ /12h | 45/65/85 | 200MPa | 700°C×2h 0.15MPa | 1900°C×10h 5MPa N$_2$ |
| Example 10 | 0.1MPa/N$_2$ | 100rpm/ 4h+8h | -0.5kPa | 0.1MPa/ N$_2$ /12h | 45/65/85 | 100MPa | 700°C×2h 0.15MPa | 1900°C×10h 5MPa N$_2$ |
| Example 11 | 0.1MPa/N$_2$ | 100rpm/ 4h+8h | -0.5kPa | 0.1MPa/ N$_2$ /12h | 45/65/85 | 100MPa | 700°C×2h 0.15MPa | 1900°C×10h 5MPa N$_2$ |
| Comparative Example 1 | 0.1MPa/N$_2$ | 100rpm 4h+8h | -0.5 kPa | 0.1MPa/ N$_2$ /12h | 45/65/85 | / | 700°C×2h 0.15MPa | 1900°C×10h 5MPa N$_2$ |
| Comparative Example 2 | 0.1MPa/N$_2$ | 100rpm 4h+8h | -0.5 kPa | 0.1MPa/ N$_2$ /12h | 45/65/85 | 100MPa | 700°C×2h 0.15MPa | 1900°C×10h 0.1MPa N$_2$ |
| Comparative Example 3 | 0.1MPa/N$_2$ | 100rpm 4h+8h | -0.5 kPa | 0.1MPa/ N$_2$ /12h | 45/65/85 | 100MPa | 700°C×2h Vacuum | 1900°C×10h 5MPa N$_2$ |
| Comparative Example 4 | 0.1MPa/N$_2$ | 100rpm 4h+8h | / | 0.1MPa/ N$_2$ | 45/65/85 | 100MPa | 700°C×2h 0.15MPa | 1900°C×10h 5MPa N$_2$ |
| Comparative Example 5 | 0.1MPa/N$_2$ | 100rpm 4h+8h | -0.5 kPa | 0.1MPa/ N$_2$ /12h | 45/65/85 | 100MPa | 700°C×2h 0.15MPa | 1900°C×10h 5MPa N$_2$ |
| Comparative Example 6 | Air atmosphere | 100rpm/ 4h+8h | -0.5kPa | 0.1MPa/ N$_2$ /12h | 45/65/85 | 100MPa | 700°C×2h 0.15MPa | 1900°C×10h 5MPa N$_2$ |

FIG. 5

Table 2:

| | Dimensions/mm×mm | Thermal conductivity (W·m⁻¹·K⁻¹) | Thickness (mm) | Thickness deviation (±mm) | Flatness (mm) | Surface roughness (μm) | Remarks |
|---|---|---|---|---|---|---|---|
| Example 1 | 114.4×114.4 | 95 | 0.32 | 0.02 | 0.2 | 0.4 | Intact |
| Example 2 | 114.4×114.4 | 84 | 0.20 | 0.02 | 0.2 | 0.6 | Intact |
| Example 3 | 114.4×114.4 | 103 | 0.64 | 0.02 | 0.15 | 0.3 | Intact |
| Example 4 | 114.4×114.4 | 98 | 0.85 | 0.02 | 0.1 | 0.3 | Intact |
| Example 5 | 114.4×114.4 | 92 | 0.50 | 0.02 | 0.15 | 0.5 | Intact |
| Example 6 | 139.7×190.5 | 98 | 0.50 | 0.02 | 0.14 | 0.5 | Intact |
| Example 7 | 139.7×190.5 | 100 | 0.32 | 0.02 | 0.16 | 0.4 | Intact |
| Example 8 | 139.7×190.5 | 102 | 0.20 | 0.02 | 0.2 | 0.5 | Intact |
| Example 9 | 139.7×190.5 | 103 | 0.85 | 0.02 | 0.1 | 0.3 | Intact |
| Example 10 | 160.0×160.0 | 95 | 0.50 | 0.02 | 0.25 | 0.5 | Intact |
| Example 11 | 196.0×196.0 | 98 | 0.50 | 0.02 | 0.2 | 0.5 | Intact |
| Comparative Example 1 | 114.8×114.8 | 90 | 0.33 | 0.05 | 0.3 | 0.6 | Intact |
| Comparative Example 2 | 114.4×114.4 | 78 | 0.32 | 0.02 | 0.2 | 1.2 | Intact |
| Comparative Example 3 | 114.4×114.4 | 93 | 0.32 | 0.03 | 0.3 | 0.4 | Microcrack |
| Comparative Example 4 | 114.6×114.7 | 94 | 0.32 | 0.03 | 0.5 | 0.5 | Bubble |
| Comparative Example 5 | 114.4×114.4 | 92 | 0.32 | 0.03 | 0.4 | 0.5 | Color spot |
| Comparative Example 6 | 114.2×114.2 | 75 | 0.32 | 0.02 | 0.2 | 0.4 | Intact |

FIG. 6

PREPARATION METHOD OF HIGH-THERMAL-CONDUCTIVITY AND NET-SIZE SILICON NITRIDE CERAMIC SUBSTRATE

TECHNICAL FIELD

The present disclosure relates to a preparation method of a high-thermal-conductivity and net-size silicon nitride ceramic substrate, and belongs to the field of ceramic material preparation.

BACKGROUND

In recent years, semiconductor devices have developed rapidly along the direction of high power, high frequency, and integration. The heat generated by the operation of semiconductor devices is a key factor causing the failure of semiconductor devices, while the thermal conductivity of a insulating substrate is a key to affecting the overall heat dissipation of semiconductor devices. In addition, in the fields of electric vehicles and high-speed rail, semiconductor devices generally face complex mechanical environments such as bumps and vibrations during use, which impose strict requirements on mechanical reliability of the materials used.

High-thermal-conductivity silicon nitride ($Si_3N_4$) ceramics have excellent mechanical and thermal properties. Excellent mechanical properties and desirable high thermal conductivity potentials make the silicon nitride ceramics expected to make up for the shortcomings of existing substrate materials such as alumina and aluminum nitride. Therefore, this type of ceramic shows great market prospects in the application of high-end semiconductor devices, especially high-power semiconductor devices.

At present, the thickness of silicon nitride ceramic substrates for commercial applications are concentrated around 0.2 mm to 0.8 mm. It is extremely difficult to mold such a thin sample. Accordingly, the molding of substrates is a core technology to realize mass production and subsequent application. Currently, the molding methods of ceramic substrates mainly include tape casting, dry pressing, and roll forming. In the dry pressing, due to the non-uniformity of powder flow and the process characteristics of mechanical pressing, it is generally difficult to directly prepare ceramic substrates with a thickness of less than 0.5 mm. Moreover, the ceramic substrate has a thickness that cannot be accurately controlled and is not uniform, thus requiring subsequent machining. The roll forming has a complicated process and needs to be repeated to eliminate the uneven thickness caused by limitations of this process and the lumps caused by agglomeration of raw materials. As a result, the prepared ceramic substrate is prone to blisters and uneven surfaces, and machining is also required to meet the requirements of subsequent copper cladding. In contrast, the tape casting has high production efficiency and low cost, can realize full automation, and is convenient for continuous batch production. In view of this, the tape casting is the most promising and potential process technology for ceramic substrate molding. However, this technique also shows the phenomenon that prepared cast films are prone to blistering, cracking, deformation, and uneven thickness, resulting in poor yield, low flatness, uneven thickness, and subsequent machining required. The ceramic substrate requires high flatness, uniform thickness, and smooth surface, which are the process requirements for subsequent copper cladding.

SUMMARY

For this reason, the present disclosure provides a preparation method of a high-thermal-conductivity and net-size silicon nitride ceramic substrate, including the following steps:

(1) mixing an original powder, a sintering aid, a dispersant, a defoamer, a binder, and a plasticizer in a protective atmosphere to allow vacuum degassing at a vacuum degree of −0.1 kPa to −10 kPa for 6 h to 24 h to obtain a mixed slurry; where the original powder is at least one selected from the group consisting of a silicon nitride powder and a silicon powder;

(2) subjecting the mixed slurry to tape casting and drying in a nitrogen atmosphere to obtain a first green body; where the drying is conducted in a mobile hot $N_2$ atmosphere with a progressively increasing temperature;

(3) subjecting the first green body to shaping pretreatment to obtain a second green body; where the shaping pretreatment refers to treating the first green body by cold isostatic pressing;

(4) subjecting the second green body to debonding at 500° C. to 900° C. for 1 h to 3 h in a micro-positive-pressure nitrogen atmosphere with an atmospheric pressure of 0.12 MPa to 0.2 MPa to obtain a third green body; and (5) subjecting the third green body to gas pressure sintering in a nitrogen atmosphere at 1,800° C. to 2,000° C. to obtain the high-thermal-conductivity and net-size silicon nitride ceramic substrate; where a crucible for the gas pressure sintering is selected from the group consisting of a high-purity boron nitride (BN) crucible or a graphite crucible with a high-purity BN isolation layer coated on a surface.

In the present disclosure, the slurry preparation, vacuum degassing, tape casting, green body drying, green body shaping, debonding, and sintering processes in the tape casting are designed and regulated. This solves the easy blistering, cracking, deformation, and uneven thickness of the casting substrate, and realizes net-size molding of the high-thermal-conductivity silicon nitride ceramic substrate. Specifically, during preparing the casting slurry, a mixture is fully ball-milled and mixed in a protective atmosphere combined with low-vacuum and long-term degassing, so as to reduce or eliminate air bubbles in the slurry and reduce agglomeration in the slurry. During the tape casting, a cylindrical scraper and its height are precisely controlled, and a continuous hot $N_2$ atmosphere with increasing temperature dries a cast film green body, thereby achieving high-quality and defect-free cast film preparation and precise control of its thickness uniformity. Measures such as the $N_2$ protective atmosphere in the mixing by ball milling and tape casting processes can inhibit secondary oxidation of the silicon nitride powder, so as to ensure that the prepared silicon nitride ceramic substrate has high thermal conductivity. The isostatic-pressure shaping pretreatment further improves the density, thickness uniformity, and flatness of the prepared cast film. In the micro-positive-pressure debonding, an escape rate of the gas generated by the decomposition of organic matters during the debonding is precisely controlled to prevent cracking, surface peeling, and bubble generation during the debonding of the green body, thereby avoiding surface defects of the green body. In sintering, high-nitrogen-pressure sintering controls deformation of the substrate green body during the sintering, inhibits the decomposition of silicon nitride, and then precisely adjusts a surface roughness of the silicon nitride substrate. A joint effect of the above-mentioned processes finally realizes the preparation of a high-performance net-size silicon nitride ceramic substrate with high thermal conductivity, flatness, and thickness uniformity, as well as controllable surface roughness and uniform surface quality. This ceramic substrate can be directly used in the subsequent copper cladding without subsequent machining.

Preferably, in step (1), the sintering aid is selected from the group consisting of a rare earth oxide and an alkaline earth metal oxide, and is added at 4.0 wt % to 5.0 wt % of a total mass of the silicon nitride powder, silicon nitride formed by complete nitriding of the silicon powder, and the sintering aid. Preferably, the rare earth oxide includes $Y_2O_3$, and the alkaline earth metal oxide includes MgO. Preferably, in step (1), the dispersant is at least one selected from the group consisting of polyethylene glycol (PEG) and triethyl phosphate (TEP), and is added at 0.2 wt % to 1.0 wt % of the total mass of the silicon nitride powder, the silicon nitride formed by complete nitriding of the silicon powder, and the sintering aid. Preferably, in step (1), the defoamer is oleic acid, and is added at 0.2 wt % to 1.0 wt % of the total mass of the silicon nitride powder, the silicon nitride formed by complete nitriding of the silicon powder, and the sintering aid. Preferably, in step (1), the binder is polyvinyl butyral (PVB), and is added at 5 wt % to 9 wt % of the total mass of the silicon nitride powder, the silicon nitride formed by complete nitriding of the silicon powder, and the sintering aid. Preferably, in step (1), the plasticizer is at least one selected from the group consisting of diethyl phthalate (DEP), dibutyl phthalate (DBP), and PEG, and is added at 2 wt % to 6 wt % of the total mass of the silicon nitride powder, the silicon nitride formed by complete nitriding of the silicon powder, and the sintering aid.

Preferably, in step (1), the protective atmosphere is a nitrogen atmosphere or an inert atmosphere with a pressure of 0.1 MPa. Preferably, in step (1), the mixing is conducted by ball milling at 30 rpm to 100 rpm for 6 h to 24 h; the vacuum degassing is conducted at a vacuum degree of −0.1 kPa to −10 kPa for 6 h to 24 h. Further, preferably, in step (1), at least one of the silicon nitride powder and the silicon powder, the sintering aid, the dispersant, and the defoamer are mixed by ball milling for 3 h to 12 h, and a resulting mixture is added with the binder and the plasticizer and then mixed by ball milling for 3 h to 12 h to obtain the mixed slurry.

Preferably, in step (2), the tape casting is conducted in the nitrogen atmosphere with a pressure of 0.1 MPa to 0.2 MPa. Preferably, in step (2), the drying is conducted at 40° C. to 85° C. for 15 min to 60 min in the nitrogen atmosphere of flowing nitrogen with a pressure of 0.1 MPa to 0.2 MPa; preferably, the drying is conducted in at least two stages, and a nitrogen temperature in a current stage is higher than that in a former stage; more preferably, there are three stages, including: a first stage is drying at a temperature of 40° C. to 60° C. for 5 min to 20 min, a second stage is drying at a temperature of 55° C. to 70° C. for 5 min to 20 min, and a third stage is drying at a temperature of 65° C. to 85° C. for 5 min to 20 min; and the temperature of the first stage<the temperature of the second stage<the temperature of the third stage.

Preferably, in step (3), the shaping pretreatment refers to treating the first green body by cold isostatic pressing; the cold isostatic pressing is conducted at a pressure of 40 MPa to 200 MPa for 2 min to 10 min. Preferably, in step (4), the second green body is subjected to debonding for 1 h to 3 h in a micro-positive-pressure nitrogen atmosphere with an atmospheric pressure of 0.1 MPa to 0.2 MPa.

Preferably, when the original powder includes the silicon powder, the silicon powder has a mass not less than 75% that of the original powder; and the original powder has a mass equal to a total mass of the silicon nitride powder and silicon nitride formed by complete nitriding of the silicon powder; preferably, before the gas pressure sintering is conducted, the third green body is subjected to nitriding that is conducted at 1,350° C. to 1,450° C. for 3 h to 6 h in a nitrogen atmosphere being a hydrogen/nitrogen mixed atmosphere with a hydrogen content of not more than 5 vol % and a pressure of 0.1 MPa to 0.2 MPa.

Preferably, the gas pressure sintering in step (5) is conducted in the nitrogen atmosphere at a pressure of 0.5 MPa to 10 MPa for 4 h to 12 h. Further, preferably, a crucible for the gas pressure sintering is selected from the group consisting of a high-purity boron nitride (BN) crucible or a graphite crucible with a high-purity BN isolation layer coated on a surface. The high-purity BN crucible has a purity of greater than 99%. The high-purity BN isolation layer has a purity of greater than 99%.

In another aspect, the present disclosure provides a high-thermal-conductivity and net-size silicon nitride ceramic substrate prepared by the preparation method, where the high-thermal-conductivity and net-size silicon nitride ceramic substrate has a thickness of 0.2 mm to 1.0 mm, a thickness uniformity of 0.04 mm, a flatness of 0 mm/mm to 0.002 mm/mm, a surface roughness of 0.3 μm to 0.8 μm, and a thermal conductivity of greater than 80 $W \cdot m^{-1} \cdot K^{-1}$. When the flatness, thickness uniformity, and surface roughness of the substrate are controlled at 0.002 mm/mm, +0.04 mm, and 0.3 μm to 0.8 μm, respectively, the substrate can be directly used in the subsequent copper cladding without machining.

Preferably, the silicon nitride ceramic substrate has a size of at least 90 mm×90 mm, more preferably (114-140) mm×(114-190) mm.

Beneficial Effects

A notable feature of the present disclosure is that the silicon nitride ceramic substrate can realize precise control of sintered size and surface quality, and can be used directly without subsequent processing. Therefore, the silicon nitride ceramic substrate has a simple preparation process, and is economical and practical. Another notable feature of the present disclosure is to control the oxidation and impurity introduction during the preparation to realize the high thermal conductivity of the silicon nitride ceramic substrate.

BRIEF DESCRIPTION OF THE DRAWINGS

FIG. 5 shows process parameters of the silicon nitride ceramic substrates prepared by the present disclosure in Table 1; and FIG. 6 shows performance parameters of the silicon nitride ceramic substrates prepared by the present disclosure in Table 2.

DETAILED DESCRIPTION OF THE EMBODIMENTS

Figure 1:
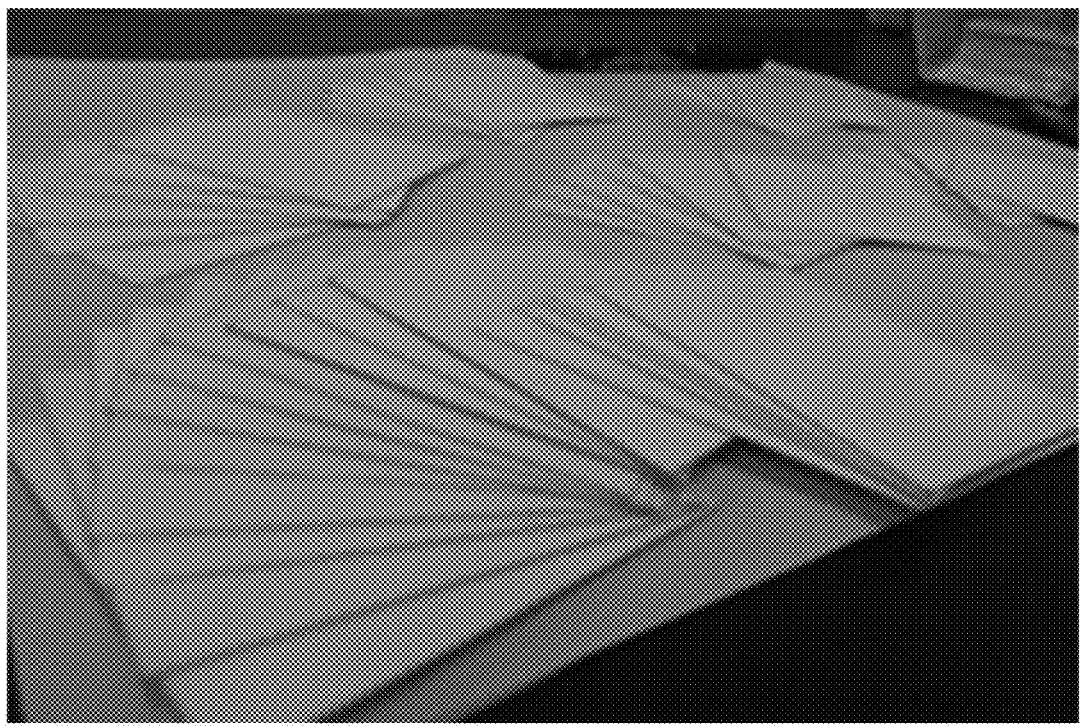
FIG. 1 shows a silicon nitride ceramic substrate prepared in Example 1.

The present disclosure will be further illustrated with reference to the following embodiments, and it should be understood that the following embodiments are intended to illustrate the present disclosure, but not to limit the present disclosure.

In the present disclosure, the slurry preparation, vacuum degassing, tape casting, green body drying, green body shaping, debonding, and sintering processes in the tape casting are designed and regulated. This solves the easy blistering, cracking, deformation, and uneven thickness of the casting substrate, and realizes the preparation of a silicon nitride ceramic substrate with uniform thickness, no surface pores and color spots, and no need for subsequent machining. The silicon nitride ceramic substrate can be directly used in the subsequent copper cladding. The preparation method of a high-thermal-conductivity and net-size silicon nitride ceramic substrate is exemplarily described below.

Preparation of agglomerate-free and bubble-free slurry: At least one of a silicon nitride powder and a silicon powder, a sintering aid, a dispersant, a defoamer, a binder, and a plasticizer are mixed by ball milling under a protective atmosphere (such as $N_2$ atmosphere, a pressure can be 0.1 MPa), and subjected to vacuum degassing to obtain a mixed slurry without agglomeration and bubbles. The ball milling is conducted using silicon nitride ceramic grinding balls. The sintering aid can be rare earth oxides and alkaline earth metal oxides. The rare earth oxide includes at least $Y_2O_3$, and the alkaline earth metal oxide includes at least MgO. The rare earth oxide and the alkaline earth metal oxide may have a molar ratio of (1.0-1.4):(2.5-2.9). When the silicon powder is contained, the silicon powder may have a content of 75 wt % to 100 wt %. The slurry is vacuumed to remove air bubbles, where a vacuum degree may be −0.1 kPa to −10 kPa, and the degassing time may be 6 h to 24 h.

Preparation of casting film green body with uniform thickness and no air bubbles on the surface: Tape casting is conducted under $N_2$ atmosphere (0.1 MPa to 0.2 MPa). Drying is conducted under a mobile hot $N_2$ atmosphere (the flow rate can be 10 L/min to 1000 L/min), so as to realize the preparation of a casting film green body with uniform thickness and no bubbles on the surface. As an example, the tape casting is conducted with a cylindrical scraper under $N_2$ atmosphere, and the thickness of the cast film green body can be adjusted by controlling a height of the scraper. The casting film green body is dried in a mobile hot $N_2$ atmosphere with increasing temperature, the hot $N_2$ atmosphere can be 40° C. to 85° C., and an atmospheric pressure can be 0.1 MPa to 0.2 MPa. For example, there are two temperature stages, including: a first stage can be drying at 40° C. to 65° C. for 15 min to 30 min, and a second stage can be drying at 60° C. to 85° C. for 15 min to 30 min; and the temperature of the first stage is lower than the temperature of the second stage. For example, there are three stages, including: a first stage can be drying at 40° C. to 60° C. for 5 min to 20 min, a second stage can be drying at 55° C. to 70° C. for 5 min to 20 min, and a third stage can be drying at 65° C. to 85° C. for 5 min to 20 min; and the temperature of the first stage<the temperature of the second stage<the temperature of the third stage.

Shaping pretreatment of cast film green body: Under a certain pressure (40 MPa to 200 MPa), cold isostatic pressing and shaping pretreatment are conducted on the cast film green body (substrate green body) after cutting, so as to ensure the thickness uniformity and flatness of the cast film. The shaping pretreatment may be conducted for 2 min to 10 min.

Debonding of substrate green body: The substrate green body is subjected to heat treatment under micro-positive pressure and a certain temperature. As an example, a micro-positive pressure is generated by introducing $N_2$ atmosphere, the atmosphere pressure can be 0.1 MPa to 0.2 MPa, the heat treatment is conducted at 500° C. to 900° C. for 1 h to 3 h.

Nitriding of substrate green body: When the original powder includes the silicon powder, the silicon powder has a mass not less than 75% that of the original powder; and the original powder has a mass equal to a total mass of the silicon nitride powder and silicon nitride formed by complete nitriding of the silicon powder. When the original powder includes the silicon powder, the substrate green body is nitrided in a hydrogen/nitrogen mixed atmosphere with a hydrogen content of not higher than 5 vol % at a certain temperature. As an example, the green body is subjected to nitriding that is conducted at 1,350° C. to 1,450° C. for 3 h to 6 h in a nitrogen atmosphere being a hydrogen/nitrogen mixed atmosphere with a hydrogen content of not more than 5 vol % and a pressure of 0.1 MPa to 0.2 MPa.

Sintering of the substrate green body: Gas pressure sintering is conducted under a high-pressure $N_2$ atmosphere. As an example, the substrate green body is subjected to gas pressure sintering in a BN crucible under a high-pressure $N_2$ atmosphere, and the $N_2$ atmosphere pressure is preferably 0.5 MPa to 10 MPa. This pressure range is more conducive to improving the mechanical/thermal/electrical properties of the material and reducing the roughness of the substrate surface. The sintering may be conducted at 1,800° C. to 2,000° C. for 4 h to 12 h.

In summary, the preparation of the high-thermal-conductivity and net-size silicon nitride ceramic substrate in the present disclosure is always conducted in a nitrogen atmosphere. The silicon nitride ceramic substrate is tested with a micrometer to have a thickness uniformity of +0.04 mm. The silicon nitride ceramic substrate is tested by a profiler to have a flatness of 0 mm/mm to 0.002 mm/mm. The silicon nitride ceramic substrate is tested by a profiler to have a surface roughness of 0.3 μm to 0.8 μm. The silicon nitride ceramic substrate is tested by a laser thermal conductivity meter to have a thermal conductivity of greater than 80 $W \cdot m^{-1} \cdot K^{-1}$.

The present disclosure will be described in detail below with reference to the accompanying examples. It should also be understood that the following examples are only used to further illustrate the present disclosure, and should not be construed as limiting the protection scope of the present disclosure. Some non-essential improvements and adjustments made by those skilled in the art based on the above contents of the present disclosure belong to the protection scope of the present disclosure. The specific process parameters and the like in the following examples are only examples of suitable ranges. That is, those skilled in the art can make a selection within a suitable range through the description herein, and the parameters are not limited to the specific numerical values exemplified below.

Example 1

A starting ceramic powder (silicon nitride 95 g), a sintering aid (5 g, $Y_2O_3$:MgO=1.2:2.5 by molar ratio), a defoamer (oleic acid, 0.5 g), a dispersant (PEG, 0.5 g), grinding balls (silicon nitride balls, 200 g), and an organic solvent (absolute ethanol, 80 g) were placed in a sealed nylon ball milling tank, vacuumized, and protected by $N_2$ atmosphere introduction, and subjected to ball milling at 100 rpm for 4 h. A binder (PVB, 7 g) and a plasticizer (DBP, 4 g) were further added to a resulting mixture, and ball milling was continued for 8 h under the protection of $N_2$ atmosphere to obtain a uniformly dispersed and non-agglomerated slurry. The slurry was vacuumized to remove air bubbles for 12 h at a vacuum degree of −0.5 kPa. Under the $N_2$ protective atmosphere, a resulting debubbled slurry was subjected to tape casting with a cylindrical scraper, and a thickness of an obtained cast film green body was precisely controlled at (0.4±0.04) mm by controlling a height of the scraper. The cast film green body was dried with a mobile hot $N_2$ atmosphere (at a flow rate of 100 L/min), where s pressure of the $N_2$ atmosphere was 0.1 MPa, and the hot $N_2$ atmosphere with increasing temperature included front, middle, and back stages with temperatures of 45° C. (8 min), 65° C. (8 min) and 80° C. (8 min), respectively. The cast film green body was cut into square pieces of 143.0 mm×143.0 mm by an automatic slicer, and subjected to cold isostatic pressing and shaping treatment at 100 MPa for 5 min. An obtained shaped substrate green body was subjected to debonding at 700° C. for 2 h under a $N_2$ atmosphere of 0.15 MPa. An obtained debonded substrate green body was loaded into a high-purity BN crucible (purity>99%), sintered in a gas pressure sintering furnace at 1,900° C. for 10 h under a $N_2$ atmosphere of 5 MPa, and then cooled to room temperature with the furnace.

Figure 2A:
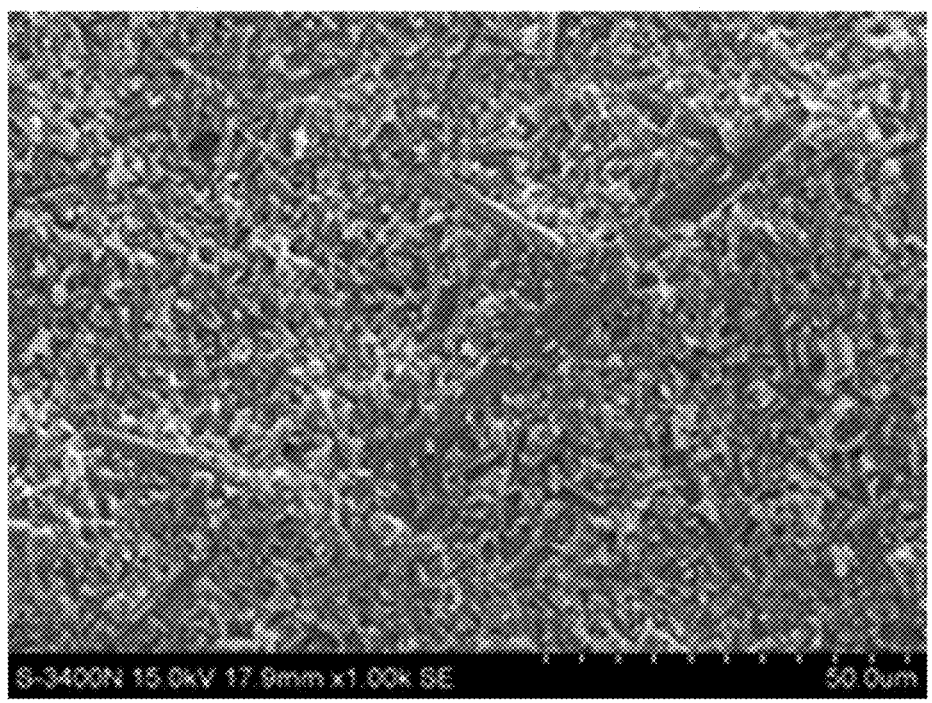
FIGS. 2A and 2B show a microstructure of the silicon nitride ceramic substrate prepared in Example 1.
Figure 2B:
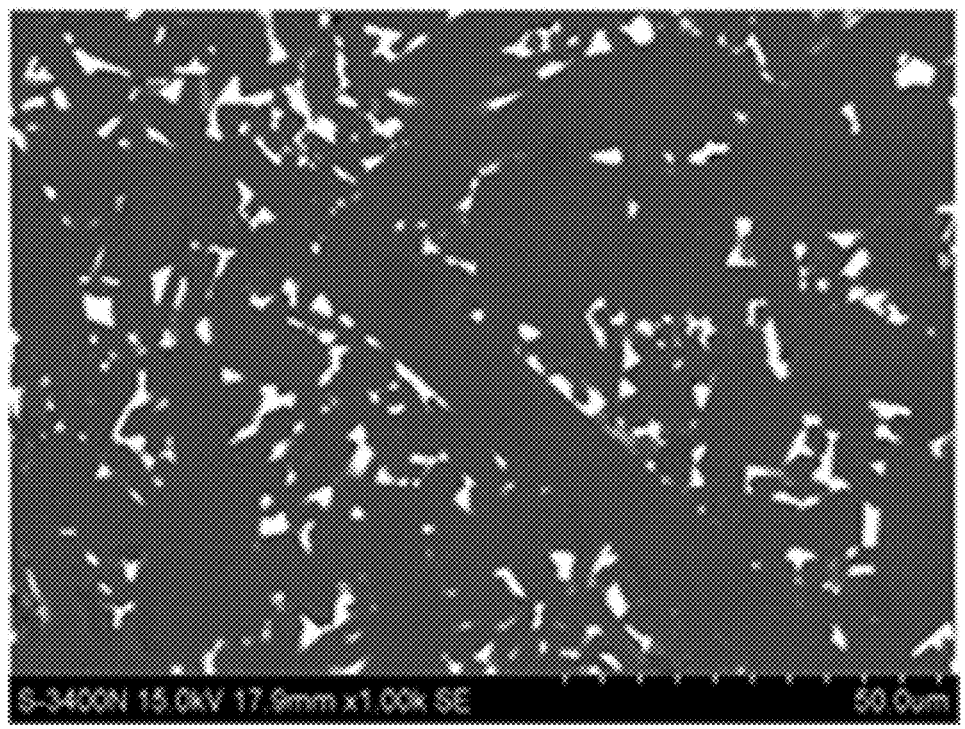

In Example 1, the silicon nitride ceramic substrate was shown in FIG. 1, with a size of 114.4 mm×114.4 mm, a size deviation of 0.1 mm, a thickness of (0.32±0.02) mm, a flatness of 0.2 mm, and a roughness of 0.4 μm. The substrate had a thermal conductivity of 95 W/(m·K) and a bending strength of 780 MPa. The substrate did not require subsequent machining and could be directly used in the subsequent copper cladding. The substrate had a cross-sectional microstructure shown in FIGS. 2A and 2B, and the microstructure was uniform and dense.

Examples 2 to 5

Raw material ratio and composition, technological process referred to Example 1. Specific parameters such as slurry preparation, vacuum degassing, tape casting, green body shaping, debonding, and sintering were shown in Table 1 in FIG. 5. The prepared substrate material had properties shown in Table 2 in FIG. 6.

Example 6

A starting ceramic powder (silicon nitride 3 g, silicon powder 55 g), a sintering aid (4.5 g, $Y_2O_3$:MgO=1.1:2.9 by molar ratio), a defoamer (oleic acid, 0.3 g), a dispersant (PEG, 0.3 g), grinding balls (silicon nitride balls, 120 g), and an organic solvent (absolute ethanol, 50 g) were placed in a sealed nylon ball milling tank, vacuumized, and protected by $N_2$ atmosphere introduction, and subjected to ball milling at 100 rpm for 4 h. A binder (PVB, 5 g) and a plasticizer (DBP, 3 g) were further added to a resulting mixture, and ball milling was continued for 8 h under the protection of $N_2$ atmosphere to obtain a uniformly dispersed and non-agglomerated slurry. The slurry was vacuumized to remove air bubbles for 12 h at a vacuum degree of −0.5 kPa. Under the $N_2$ protective atmosphere, a resulting debubbled slurry was subjected to tape casting with a cylindrical scraper, and a thickness of an obtained cast film green body was precisely controlled at (0.5±0.05) mm by controlling a height of the scraper. The cast film green body was dried with a mobile hot $N_2$ atmosphere (at a flow rate of 50 L/min), where s pressure of the $N_2$ atmosphere was 0.2 MPa, and the hot $N_2$ atmosphere with increasing temperature included front, middle, and back stages with temperatures of 45° C. (6 min), 65° C. (6 min) and 80° C. (6 min), respectively. The cast film green body was cut into square pieces of 142.6 mm×194.4 mm by an automatic slicer, and subjected to cold isostatic pressing and shaping treatment at 150 MPa for 3 min. An obtained shaped substrate green body was subjected to debonding at 700° C. for 2 h under a $N_2$ atmosphere of 0.15 MPa. An obtained debonded substrate green body was nitrided at 1,450° C. for 6 h under a 0.2 MPa $N_2$ atmosphere (containing 5% $H_2$). An obtained nitrided substrate green body was loaded into a high-purity BN crucible (purity>99%), sintered in a gas pressure sintering furnace at 1,900° C. for 10 h under a $N_2$ atmosphere of 5 MPa, and then cooled to room temperature with the furnace. The substrate had material properties shown in Table 2.

Examples 7 to 9

Raw material ratio and composition, technological process referred to Example 6. Specific parameters such as slurry preparation, vacuum degassing, tape casting, green body shaping, debonding, nitriding, and sintering were shown in Table 1. The prepared substrate material had properties shown in Table 2.

Example 10

In Example 10, a preparation method of the silicon nitride ceramic substrate referred to that of Example 1, except that: the cast film green body was cut into square pieces of 200 mm×200 mm by an automatic slicer, and subjected to cold isostatic pressing and shaping at 100 MPa.

Example 11

In Example 11, a preparation method of the silicon nitride ceramic substrate referred to that of Example 6, except that: the cast film green body was cut into square pieces of 200 mm×200 mm by an automatic slicer, and subjected to cold isostatic pressing and shaping at 100 MPa.

Comparative Example 1

Specific parameters such as raw material ratio and composition, slurry preparation, vacuum degassing, tape casting, debonding, and sintering processes were shown in Table 1. The technical process referred to the Example 1, except that no shaping pretreatment of the green body was conducted. The substrate had material properties shown in Table 2. Since no cold isostatic pressing and shaping pretreatment were conducted on the substrate green body of tape casting, the prepared ceramic substrate had significantly reduced thickness uniformity, flatness, and slightly reduced thermal conductivity.

Comparative Example 2

Specific parameters such as raw material ratio and composition, slurry preparation, vacuum degassing, tape casting, green body shaping, debonding, and sintering processes were shown in Table 1. The technical process referred to the Example 1, except that high-temperature sintering was not conducted with high nitrogen pressure, only 0.1 MPa $N_2$ protective atmosphere was adopted. The substrate had material properties shown in Table 2. Since the gas pressure sintering in a high nitrogen atmosphere was not adopted, the prepared ceramic substrate had a significantly increased surface roughness, which could not meet the requirements of subsequent copper cladding on the surface roughness of the substrate.

Comparative Example 3

Figure 3:
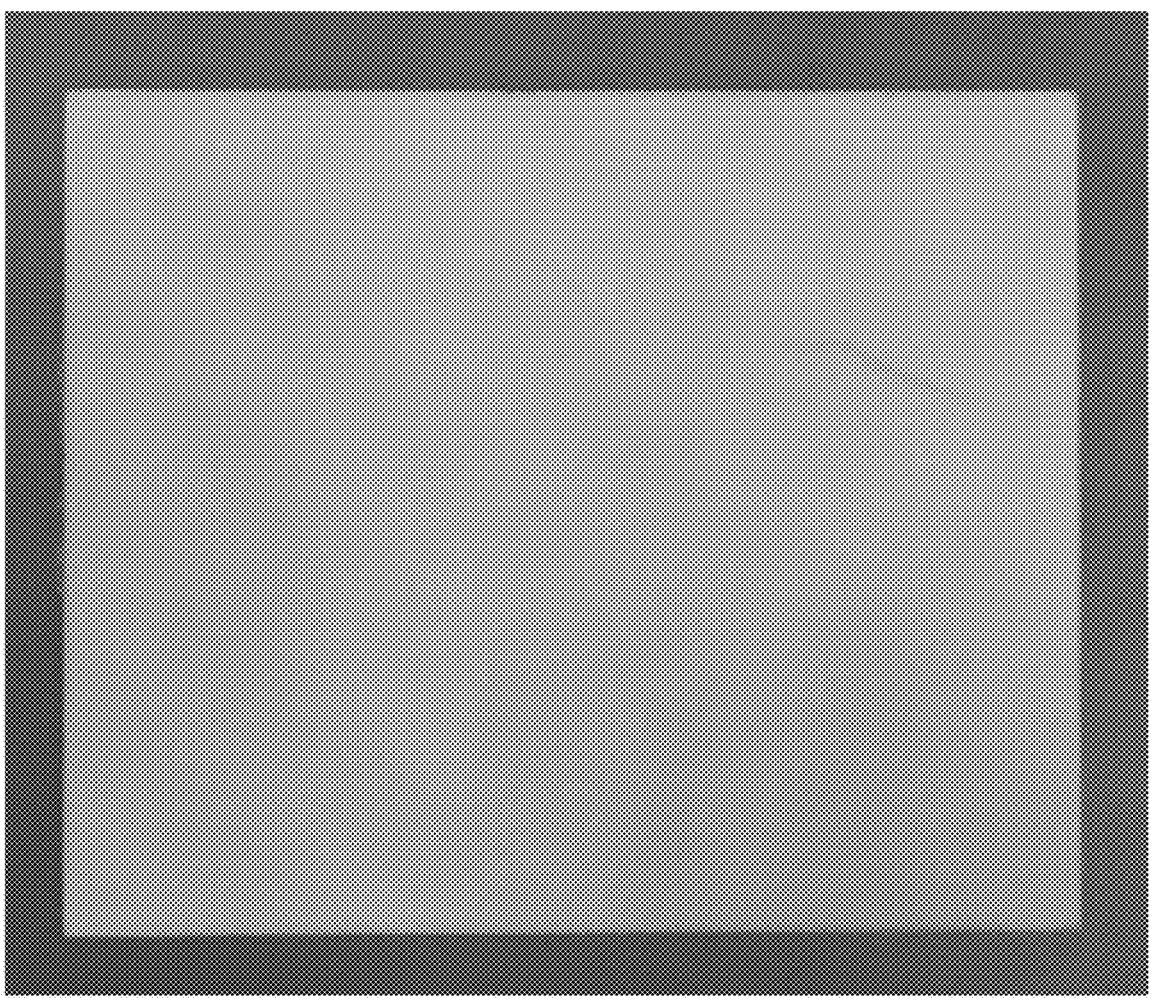
FIG. 3 shows a silicon nitride ceramic substrate prepared in Comparative Example 3.

Specific parameters such as raw material ratio and composition, slurry preparation, vacuum degassing, tape casting, green body shaping, debonding, and sintering processes were shown in Table 1. The technical process referred to the Example 1, except that no debonding with micro-positive pressure was conducted (instead of debonding with vacuum conditions). The substrate had material properties shown in Table 2. Vacuum debonding led to an uncontrollable (too high) escape rate of gas generated by the decomposition of organic matters during the debonding, making the prepared ceramic substrate locally have microcrack defects on its surface (FIG. 3).

Comparative Example 4

Specific parameters such as raw material ratio and composition, slurry preparation, tape casting, green body shaping, debonding, and sintering processes were shown in Table 1. The technical process referred to the Example 1, except that no vacuum degassing was conducted. The substrate had material properties shown in Table 2. Since the vacuum degassing was not adopted, there were a small amount of air bubbles in the slurry, such that small air bubbles existed locally on the surface of the prepared ceramic substrate.

Comparative Example 5

Figure 4A:
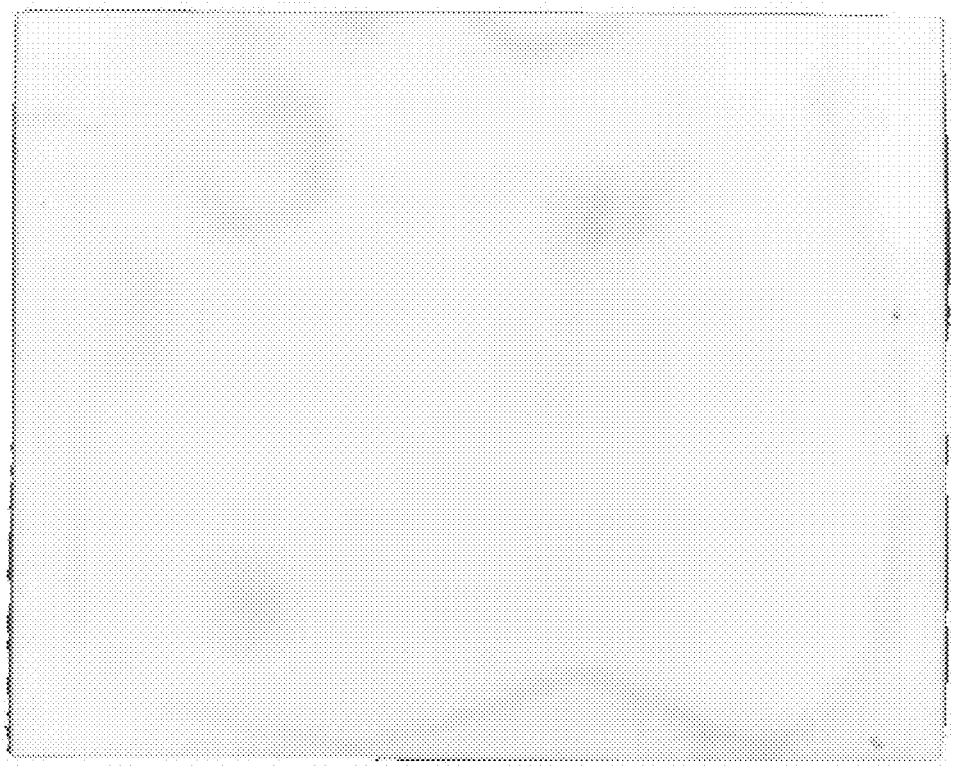
FIGS. 4A and 4B show a silicon nitride ceramic substrate prepared in Comparative Example 5.
Figure 4B:

Specific parameters such as raw material ratio and composition, slurry preparation, vacuum degassing, tape casting, green body shaping, debonding, and sintering processes were shown in Table 1. The technical process referred to the Example 1, except that the high-temperature sintering of the silicon nitride substrate green body was not conducted in a high-purity BN crucible as a container, but directly in a graphite crucible. The substrate had material properties shown in Table 2. Since the high-purity BN crucible was not used, the graphite crucible was easy to contaminate the substrate, such that the prepared ceramic substrate showed poor surface uniformity and local color spots (FIGS. 4A and 4B).

Comparative Example 6

Specific parameters such as raw material ratio and composition, slurry preparation, vacuum degassing, tape casting, green body shaping, debonding, and sintering processes were shown in Table 1. The technical process referred to the Example 1, except that the ball milling of the slurry was conducted in an air atmosphere. Since there was no nitrogen atmosphere protection, the silicon nitride powder was oxidized to a certain extent during the ball milling, resulting in low thermal conductivity of the prepared silicon nitride ceramic substrate.

What is claimed is:

1. A preparation method of a high-thermal-conductivity and net-size silicon nitride ceramic substrate, comprising the following steps:
   (a) mixing an original powder, a sintering aid, a dispersant, a defoamer, a binder, and a plasticizer in a protective atmosphere to allow vacuum degassing at a vacuum degree of −0.1 kPa to −10 kPa for 6 h to 24 h to obtain a mixed slurry; wherein the original powder is at least one selected from the group consisting of a silicon nitride powder and a silicon powder;
   (b) subjecting the mixed slurry to tape casting and drying in a nitrogen atmosphere to obtain a first green body; wherein the drying is conducted in a mobile hot N2 atmosphere with a progressively increasing temperature;
   (c) subjecting the first green body to shaping pretreatment to obtain a second green body; wherein the shaping pretreatment refers to treating the first green body by cold isostatic pressing;
   (d) subjecting the second green body to debonding at 500° C. to 900° C. for 1 h to 3 h in a micro-positive-pressure nitrogen atmosphere with an atmospheric pressure of 0.12 MPa to 0.2 MPa to obtain a third green body; and
   (e) subjecting the third green body to gas pressure sintering in a nitrogen atmosphere at 1,800° C. to 2,000° C. to obtain the high-thermal-conductivity and net-size silicon nitride ceramic substrate; wherein a crucible for the gas pressure sintering is selected from the group consisting of a high-purity boron nitride (BN) crucible or a graphite crucible with a high-purity BN isolation layer coated on a surface.

2. The preparation method according to claim 1, wherein in step (a), the sintering aid is selected from the group consisting of a rare earth oxide and an alkaline earth metal oxide, and is added at 4.0 wt % to 5.0 wt % of a total mass of the silicon nitride powder, silicon nitride formed by complete nitriding of the silicon powder, and the sintering aid;
   the dispersant is at least one selected from the group consisting of polyethylene glycol (PEG) and triethyl phosphate (TEP), and is added at 0.2 wt % to 1.0 wt % of the total mass of the silicon nitride powder, the silicon nitride formed by complete nitriding of the silicon powder, and the sintering aid;
   the defoamer is oleic acid, and is added at 0.2 wt % to 1.0 wt % of the total mass of the silicon nitride powder, the silicon nitride formed by complete nitriding of the silicon powder, and the sintering aid;
   the binder is polyvinyl butyral (PVB), and is added at 5 wt % to 9 wt % of the total mass of the silicon nitride powder, the silicon nitride formed by complete nitriding of the silicon powder, and the sintering aid; and
   the plasticizer is at least one selected from the group consisting of diethyl phthalate (DEP), dibutyl phthalate (DBP), and PEG, and is added at 2 wt % to 6 wt % of the total mass of the silicon nitride powder, the silicon nitride formed by complete nitriding of the silicon powder, and the sintering aid.

3. The preparation method according to claim 2, wherein the rare earth oxide comprises $Y_2O_3$, and the alkaline earth metal oxide comprises MgO.

4. The preparation method according to claim 2, wherein the protective atmosphere is a nitrogen atmosphere or an inert atmosphere with a pressure of 0.1 MPa, and the mixing is conducted by ball milling at 30 rpm to 100 rpm for 6 h to 24 h in step (a).

5. The preparation method according to claim 4, wherein at least one of the silicon nitride powder and the silicon powder, the sintering aid, the dispersant, and the defoamer are mixed by ball milling for 3 h to 12 h, and a resulting mixture is added with the binder and the plasticizer and then mixed by ball milling for 3 h to 12 h to obtain the mixed slurry.

6. The preparation method according to claim 1, wherein the protective atmosphere is a nitrogen atmosphere or an inert atmosphere with a pressure of 0.1 MPa, and the mixing is conducted by ball milling at 30 rpm to 100 rpm for 6 h to 24 h in step (a).

7. The preparation method according to claim 6, wherein at least one of the silicon nitride powder and the silicon powder, the sintering aid, the dispersant, and the defoamer are mixed by ball milling for 3 h to 12 h, and a resulting mixture is added with the binder and the plasticizer and then mixed by ball milling for 3 h to 12 h to obtain the mixed slurry.

8. The preparation method according to claim 1, wherein in step (b), the tape casting is conducted in the nitrogen atmosphere with a pressure of 0.1 MPa to 0.2 MPa; and
the drying is conducted at 40° C. to 85° C. for 15 min to 60 min in the nitrogen atmosphere of flowing nitrogen with a pressure of 0.1 MPa to 0.2 MPa.

9. The preparation method according to claim 8, wherein the drying is conducted in at least two stages, and a nitrogen temperature in a current stage is higher than that in a former stage.

10. The preparation method according to claim 9, wherein when there are three stages, a first stage is drying at a temperature of 40° C. to 60° C. for 5 min to 20 min, a second stage is drying at a temperature of 55° C. to 70° C. for 5 min to 20 min, and a third stage is drying at a temperature of 65° C. to 85° C. for 5 min to 20 min; and the temperature of the first stage<the temperature of the second stage<the temperature of the third stage.

11. The preparation method according to claim 1, wherein the cold isostatic pressing in step (c) is conducted at a pressure of 40 MPa to 200 MPa for 2 min to 10 min.

12. The preparation method according to claim 1, wherein when the original powder comprises the silicon powder, the silicon powder has a mass not less than 75% that of the original powder; and the original powder has a mass equal to a total mass of the silicon nitride powder and silicon nitride formed by complete nitriding of the silicon powder.

13. The preparation method according to claim 12, wherein before the gas pressure sintering is conducted, the third green body is subjected to nitriding that is conducted at 1,350° C. to 1,450° C. for 3 h to 6 h in a nitrogen atmosphere being a hydrogen/nitrogen mixed atmosphere with a hydrogen content of not more than 5 vol % and a pressure of 0.1 MPa to 0.2 MPa.

14. The preparation method according to claim 1, wherein the gas pressure sintering in step (e) is conducted in the nitrogen atmosphere at a pressure of 0.5 MPa to 10 MPa for 4 h to 12 h.

15. A high-thermal-conductivity and net-size silicon nitride ceramic substrate prepared by the preparation method according to claim 1, wherein the high-thermal-conductivity and net-size silicon nitride ceramic substrate has a thickness of 0.2 mm to 1.0 mm, a thickness uniformity of ±0.04 mm, a flatness of 0 mm/mm to 0.002 mm/mm, a surface roughness of 0.3 um to 0.8 um, and a thermal conductivity of greater than 80 W·m$^{-1}$·K$^{-1}$.

16. The high-thermal-conductivity and net-size silicon nitride ceramic substrate according to claim 15, wherein in step (a), the sintering aid is selected from the group consisting of a rare earth oxide and an alkaline earth metal oxide, and is added at 4.0 wt % to 5.0 wt % of a total mass of the silicon nitride powder, silicon nitride formed by complete nitriding of the silicon powder, and the sintering aid;
the dispersant is at least one selected from the group consisting of polyethylene glycol (PEG) and triethyl phosphate (TEP), and is added at 0.2 wt % to 1.0 wt % of the total mass of the silicon nitride powder, the silicon nitride formed by complete nitriding of the silicon powder, and the sintering aid;
the defoamer is oleic acid, and is added at 0.2 wt % to 1.0 wt % of the total mass of the silicon nitride powder, the silicon nitride formed by complete nitriding of the silicon powder, and the sintering aid;
the binder is polyvinyl butyral (PVB), and is added at 5 wt % to 9 wt % of the total mass of the silicon nitride powder, the silicon nitride formed by complete nitriding of the silicon powder, and the sintering aid; and
the plasticizer is at least one selected from the group consisting of diethyl phthalate (DEP), dibutyl phthalate (DBP), and PEG, and is added at 2 wt % to 6 wt % of the total mass of the silicon nitride powder, the silicon nitride formed by complete nitriding of the silicon powder, and the sintering aid.

17. The high-thermal-conductivity and net-size silicon nitride ceramic substrate according to claim 16, wherein the rare earth oxide comprises $Y_2O_3$, and the alkaline earth metal oxide comprises MgO.

18. The high-thermal-conductivity and net-size silicon nitride ceramic substrate according to claim 15, wherein the protective atmosphere is a nitrogen atmosphere or an inert atmosphere with a pressure of 0.1 MPa, and the mixing is conducted by ball milling at 30 rpm to 100 rpm for 6 h to 24 h in step (a).

19. The high-thermal-conductivity and net-size silicon nitride ceramic substrate according to claim 15, wherein the high-thermal-conductivity and net-size silicon nitride ceramic substrate is in dimensions of at least 90 mm×90 mm.

20. The high-thermal-conductivity and net-size silicon nitride ceramic substrate according to claim 19, wherein the high-thermal-conductivity and net-size silicon nitride ceramic substrate is in dimensions of at least 114 mm to 140 mm×at least 114 mm to 190 mm.

* * * * *